E. F. HOBAN.
HEATING DEVICE FOR VEHICLE STEERING WHEELS.
APPLICATION FILED SEPT. 11, 1917.
1,304,047.
Patented May 20, 1919.
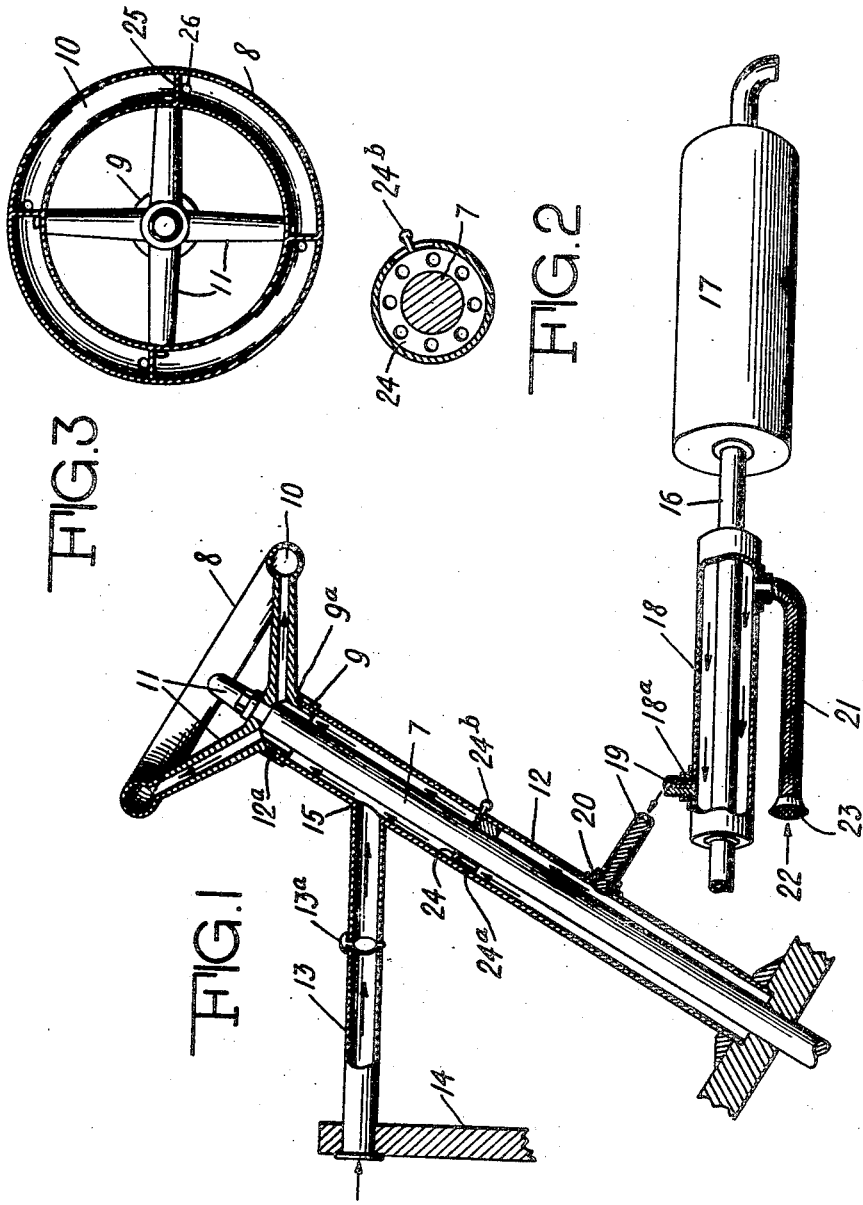
EDWARD F. HOBAN, Inventor
By his Attorney

UNITED STATES PATENT OFFICE.

EDWARD F. HOBAN, OF MADISON, NEW JERSEY.

HEATING DEVICE FOR VEHICLE STEERING-WHEELS.

1,304,047.   Specification of Letters Patent.   Patented May 20, 1919.

Application filed September 11, 1917. Serial No. 190,707.

*To all whom it may concern:*

Be it known that I, EDWARD F. HOBAN, a citizen of the United States, residing at Madison, Morris county, State of New Jersey, have invented new and useful Heating Devices for Vehicle Steering-Wheels, of which the following is a specification.

The present invention relates generally to heating appliances and is more especially directed to a device for heating the tiller or steering wheel of a motor vehicle, aeroplane, motor boat, and the like.

It is well known that many serious accidents result in the operation of vehicles of the type referred to, under cold climatic conditions, by reason of the operator's hands, which must remain in a more or less inactive position on the steering wheel, becoming benumbed by the cold. Various attempts have heretofore been made to obviate this obstacle to the efficient and safe operation of the vehicles in cold and inclement weather without success; and the primary object of the present invention is to provide a simple and positive method of heating the steering wheels of vehicles of various types which will overcome the disadvantages or faults of the previous efforts and permit the operator to manipulate the steering wheel with absolute safety so far as the impairment of his efficiency by the cold is concerned.

A further object of the present invention is to provide a heating device of this character and for the purposes heretofore pointed out which may be cheaply constructed or manufactured and installed with facility on vehicles of existing types without subjecting the parts of their steering mechanisms to any mechanical change or alteration.

My invention also comprehends a heating device for vehicles wherein a complete and constant circulation of heated fresh atmospheric air is maintained at a predetermined temperature through the agency of the power plant or engine of the vehicle.

A further advantage and object of my invention is the production of a durable device which embodies the novel features and objects heretofore set forth and which may be employed without adding to the upkeep expense of the vehicle by reason of the utilization of the waste products of the engine operation.

Other objects and advantages of my invention will make themselves manifest as I proceed with the description and I would have it understood that I reserve unto myself the full range of equivalents of structure and uses to which I may be entitled under my invention in its broadest aspect.

I shall now describe my invention with reference to the accompanying drawings wherein I have elected to illustrate one embodiment thereof in order to convey a clear and comprehensive understanding of my invention to those skilled in the art to which it appertains, it being, of course, obvious that my invention is susceptible to numerous changes in structural details without departing from the spirit and scope thereof.

In the drawings—

Figure 1 is a diagrammatic view of my invention partly in section as assembled in conjunction with the coöperating parts of a motor vehicle of conventional design.

Fig. 2 is an enlarged plan view of the controlling damper or valve, and

Fig. 3 is a sectional plan view of the steering wheel.

Referring now to the drawings in detail, in which like characters of reference are employed to designate similar parts throughout the several views, 7 represents the usual steering column or post of a motor vehicle to which the steering or tiller wheel 8 is keyed or rigidly connected in any well-known manner.

In the present instance the steering wheel 8 is of a special construction embodying a chambered or hollow hub portion 9 and a hollow rim 10, the rim being supported from the hub portion 9 by the hollow spokes or radial arms 11 as clearly shown in Fig. 1.

As will be observed from the drawings, the hub portion 9 of the steering wheel 8 is adapted to register with a cylindrical sleeve or housing 12 surrounding the tiller post 7, the upper edge 12$^a$ of said sleeve moving freely within the annular recess 9$^a$ in the wall of the hub portion 9 so as to permit of the unrestricted rotation of the wheel with relation to said sleeve. The sleeve 12, as will be seen, is of a greater diameter than the steering column 7 so as to provide an air space between those members. Communicating with the air space between the steering column 7 and the sleeve 12, as just described, is a pipe or tube 13 preferably leading from the dashboard 14 of the vehicle and tapped into the wall of the sleeve 12 as shown at 15. If desired, the outer or open end of this pipe or tube 13 may be extended in any suitable manner to a point in proximity to the engine fan, just behind the radiator of the vehicle (not shown). This will insure the entrance of fresh, cool atmospheric air to said pipe, the passage of which therethrough to the air space within sleeve 12, may be controlled by the damper or butterfly valve 13ª.

The lower end of the sleeve or housing 12 is closed in any suitable manner, such, for instance, as shown in Fig. 1, and preferably adjacent to this lower end, I make provision for the entrance of air which is heated by radiation from the exhaust pipe 16 having the usual muffler 17 connected thereto. To accomplish this, I bolt or otherwise fasten about the exhaust pipe 16 a jacket 18 of the type commonly known as stove. This jacket or stove has an outlet 18ª connected by a flexible pipe or tube 19 to the housing or sleeve 12 as shown at 20, the air entering the jacket 18 through the pipe or tube 21, open to the atmosphere at 22 and screened at 23 to prevent the entrance of dirt and other foreign substances. This latter pipe or tube may be flexible and of any desired length so that its mouth may be positioned behind the radiator or elsewhere to obtain the best results from the use of my invention under varying temperatures.

For controlling the passage of heated air through the housing or sleeve 12, I position a perforated disk valve 24 within said housing, intermediate of connections 15 and 20. This valve may be mounted on any suitable support having a perforated seat, such, for instance, as the cylindrical collar 24ª illustrated in Fig. 1, the valve being rotatable relatively to its seat by the finger piece or handle 24ᵇ projecting through a slot in the wall of the housing or sleeve 12.

It will be obvious from the structure thus far described that the heated air entering the housing 12 from the jacket or stove 18 will mix with and heat the fresh cool air entering the housing through the connection 13, the degree of heat obtained by the mixture being regulated or controlled by the manipulation of the valves 13ª and 24. The heated air rising within the housing will pass into the chambered hub portion 9 and thence into the hollow spokes or arms 11 to the rim 10 of the wheel 8. To avoid the unsatisfactory results of dead or inactive heated air within the wheel rim 10, which would defeat the objects of my invention, I provide for a continuous renewal or freshening of the air by the circulation thereof between the spokes and the wheel rim. This is effected by dividing the rim into four parts or sectors by means of the partitions or plates 25 positioned therein adjacent to the inlet from each spoke 11. Each spoke thereby communicates with one sector only, the air delivered to such sector through the spoke passing therefrom to the atmosphere through the orifice or opening 26 positioned in the underside of the sector of the wheel rim adjacent to the partition or plate of the adjoining sector. As there is an opening for the egress of the air from each sector of the wheel, it will be manifest that there will be a constant circulation of heated air through each sector of the rim 10 and the entire rim will be heated to a uniform temperature which, as before explained, may be regulated by the valves 13ª and 24.

While I have described my invention with reference to the specific showing herein, it is obvious that various forms of valves and connections may be employed and the parts disposed in other relations than those shown, without departing from the spirit and scope of my invention.

Having thus described my invention, what I claim as new herein and desire to secure by Letters Patent is:—

1. In a device of the character described, the combination of a chambered steering wheel, means for conveying cool air thereto, means for transmitting heated air for mixing with said cool air to produce an atmosphere of a predetermined temperature, and means for effecting the circulation of such heated atmosphere within said steering wheel.

2. In a device of the character described, the combination with a vehicle steering column, a steering wheel keyed thereto, a housing surrounding said column and communicating with the hub of said wheel, said hub being chambered, means for conveying cool air to said housing, means for conveying hot air to said housing from the engine exhaust, means for effecting the mixture of the cool air and hot air within said housing, means for controlling the admission of the hot air to said housing to obtain an atmosphere therein of a predetermined temperature, and means for effecting the circulation of such atmosphere through the spokes and rim of the wheel.

3. In a heating appliance of the character described, the combination of a steering wheel having a chambered hub member, a hollow rim and hollow spokes connecting said rim to said hub member, means for conveying cool air thereto and means for effecting the circulation of heated air through said hub member to portions of the rim of the wheel to mix with the cool air therein.

4. In a heating appliance for motor vehicles, the combination of a steering column, a housing surrounding said column, a steering wheel keyed to said column and having a hub formed with a chamber communicating with said housing, means connected to said housing for conveying cool air thereto, a heater mounted on the engine exhaust, means connecting said heater to said housing, means for effecting the circulation of fresh air through said heater for delivery to said housing in a heated condition, means for controlling the flow of the heated air through said housing for admixture with the cool air therein to produce a temperature of a predetermined degree, and means for effecting the circulation of the heated air thus produced through the spokes and rim of said wheel to the outer atmosphere.

5. In a device of the character described, the combination of a hollow steering wheel comprising a plurality of sections, means for conveying cool air thereto, means for transmitting heated air for mixing with said cool air to produce an atmosphere of predetermined temperature, and means for effecting the circulation of such heated atmosphere within the sections of said wheel, the circulation in each section being independent of that in the remaining sections.

6. In a heating appliance for motor vehicles, the combination of a steering wheel comprising a chambered hub member, a hollow rim and hollow spokes for supporting said rim from said hub member, a housing, means for effecting the mixture of cool and heated air within said housing for delivery to said steering wheel, a partition positioned within the rim of said wheel adjacent to each spoke connection therewith, said partitions dividing the wheel rim into a plurality of sections, the number thereof corresponding to the number of spokes in the wheel, and an outlet to the outer atmosphere for each section formed in said rim whereby the heated air delivered to said wheel will circulate within each section of the wheel rim and pass to the outer atmosphere, the circulation in each section being independent of the circulation in the remaining sections.

EDWARD F. HOBAN.